(12) United States Patent
Simon

(10) Patent No.: US 9,580,345 B2
(45) Date of Patent: Feb. 28, 2017

(54) CLOSED LOOP BLANK MOLD TEMPERATURE CONTROL SYSTEM AND METHOD

(75) Inventor: Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 1047 days.

(21) Appl. No.: 13/404,732

(22) Filed: Feb. 24, 2012

(65) Prior Publication Data

US 2012/0261850 A1    Oct. 18, 2012

Related U.S. Application Data

(60) Provisional application No. 61/474,532, filed on Apr. 12, 2011, provisional application No. 61/541,148, filed on Sep. 30, 2011.

(51) Int. Cl.
*B29C 49/06*    (2006.01)
*C03B 9/38*    (2006.01)
(Continued)

(52) U.S. Cl.
CPC ........ *C03B 9/3816* (2013.01); *B29C 49/4823* (2013.01); *B29C 49/786* (2013.01);
(Continued)

(58) Field of Classification Search
CPC .... B29C 49/64; B29C 49/6427; B29C 46/786
(Continued)

(56) References Cited

U.S. PATENT DOCUMENTS

| 3,332,765 A | 7/1967 | Champlin |
| 3,630,707 A * | 12/1971 | Ayers ............................. 65/162 |

(Continued)

FOREIGN PATENT DOCUMENTS

| DE | 102004054254 | 6/2006 |
| EP | 1136453 | 9/2001 |

(Continued)

OTHER PUBLICATIONS

European Search Report for European Patent Application No. 12158307.4 dated Jul. 14, 2014, 6 pages.
(Continued)

*Primary Examiner* — Christina Johnson
*Assistant Examiner* — Xue Liu
(74) *Attorney, Agent, or Firm* — Reinhart Boerner Van Deuren P.C.

(57) ABSTRACT

A closed loop blank mold temperature control system and method for use in the operation of an I.S. machine is disclosed for automatically adjusting machine timing to maintain desired blank mold temperature/heat extraction. The closed loop blank mold temperature control system uses measured blank mold temperatures to automatically control the supply of coolant air to the blank molds, which may be done independently to each blank mold half as well as independently to the plunger for each blank mold. The closed loop blank mold temperature control system can provide temperature setpoint commands, balance left and right parison temperatures, and maintain parison temperatures as a setpoint, all of which contribute to enhanced final glass container quality.

17 Claims, 8 Drawing Sheets

(51) Int. Cl.
  *B29C 49/48* (2006.01)
  *C03B 9/41* (2006.01)
  *B29C 49/78* (2006.01)
  *B29C 49/12* (2006.01)

(52) U.S. Cl.
  CPC .............. *C03B 9/3875* (2013.01); *C03B 9/41* (2013.01); *B29C 49/06* (2013.01); *B29C 49/12* (2013.01); *B29C 2949/78151* (2013.01); *B29C 2949/78336* (2013.01); *B29C 2949/78369* (2013.01); *Y02P 40/57* (2015.11)

(58) Field of Classification Search
  USPC ....... 65/29.1–29.19, 162, 384, 243, 83, 319, 65/355
  See application file for complete search history.

(56) References Cited

U.S. PATENT DOCUMENTS

| | | | |
|---|---|---|---|
| 4,104,046 A | * | 8/1978 | McCreery ........................ 65/161 |
| 4,557,744 A | * | 12/1985 | Fenton et al. .................. 65/29.1 |
| 4,654,066 A | | 3/1987 | Garcia et al. |
| 4,675,042 A | | 6/1987 | Taddei-Contreras et al. |
| 6,318,130 B1 | | 11/2001 | Bennett |
| 2007/0006617 A1 | | 1/2007 | Nagai et al. |

FOREIGN PATENT DOCUMENTS

| | | | | |
|---|---|---|---|---|
| JP | 08-012349 A | | 1/1996 | |
| JP | 2635931 B2 | * | 7/1997 | ........... C03B 9/3816 |
| JP | 2002-037634 | | 2/2002 | |
| JP | 2011/040318 A1 | | 4/2011 | |
| RU | 2268861 C2 | | 1/2006 | |
| WO | WO 82/02882 A1 | | 9/1982 | |
| WO | WO 00/56673 A1 | | 9/2000 | |
| WO | WO 2005/028384 A1 | | 3/2005 | |
| WO | WO 2010/055251 A1 | | 5/2010 | |
| WO | WO 2011/040318 A1 | | 4/2011 | |

OTHER PUBLICATIONS

Christian Fröba; Process control through precision and automation; Glass Worldwide, issue twenty one 2009; p. 22; 1 page.

* cited by examiner

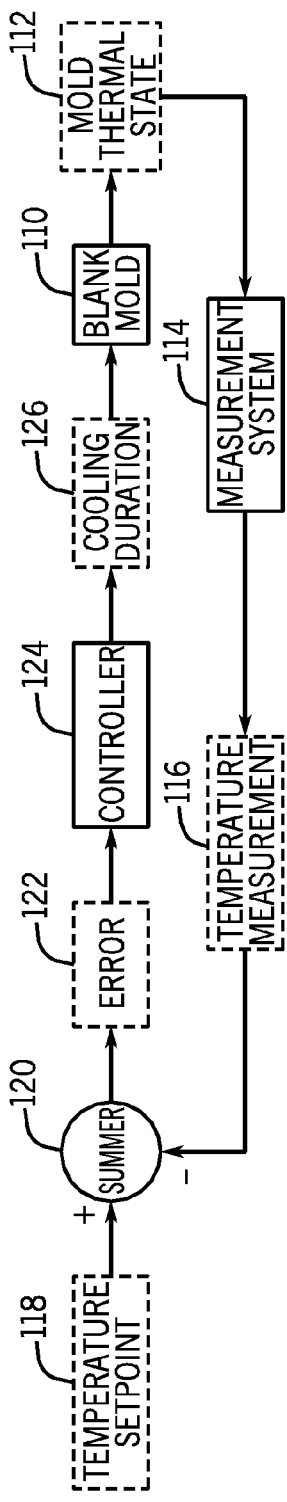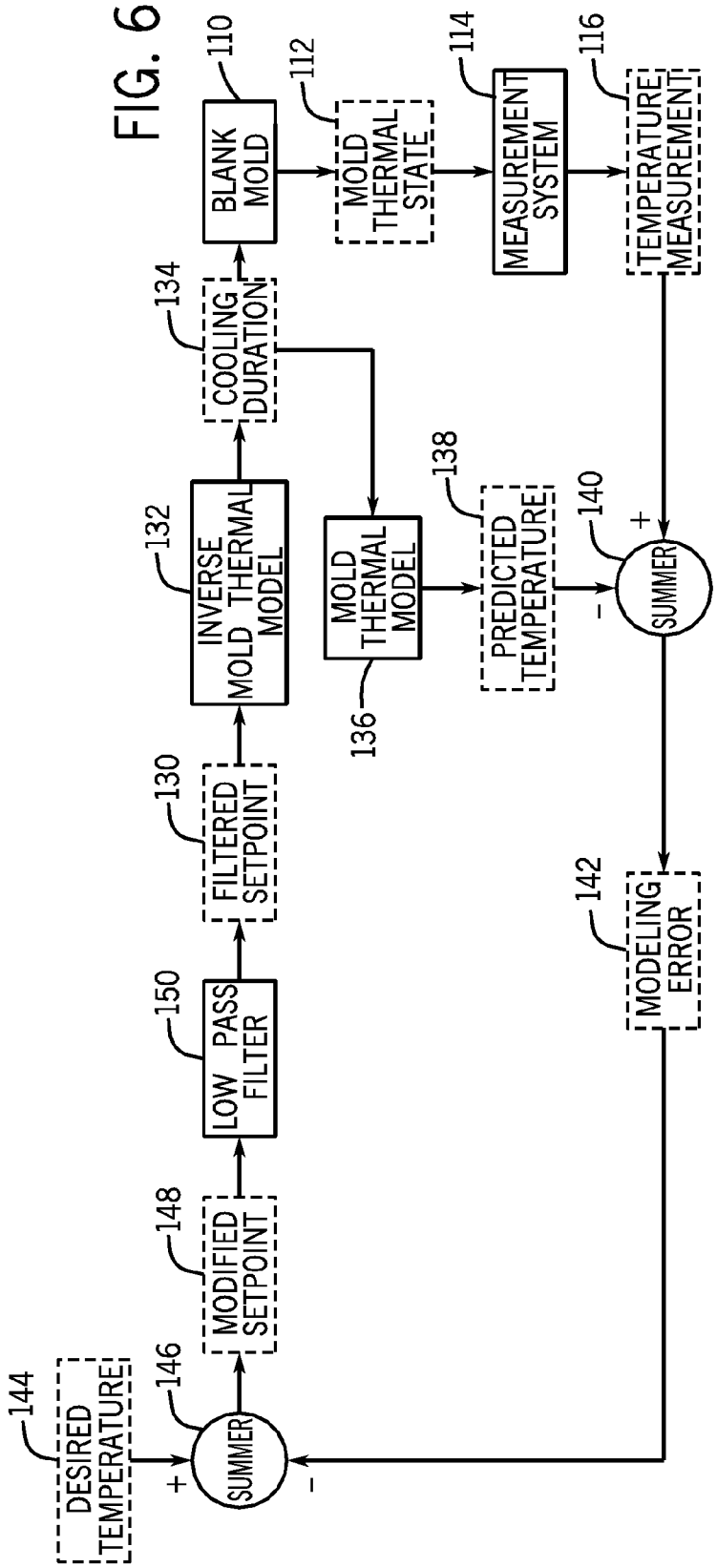

CLOSED LOOP BLANK MOLD TEMPERATURE CONTROL SYSTEM AND METHOD

IDENTIFICATION OF RELATED PATENT APPLICATIONS

This patent application claims priority of both U.S. Provisional Patent Application No. 61/474,532, which is entitled "Closed loop blank mold temperature control system and Method," and which was filed on Apr. 12, 2011, and U.S. Provisional Patent Application No. 61/541,148, which is entitled "Closed loop blank mold temperature control system and Method," and which was filed on Sep. 30, 2011, both of which patent applications are hereby incorporated herein by reference in their entirety.

BACKGROUND OF THE INVENTION

Field of the Invention

The present invention relates generally to operation of an I.S. machine and more particularly to a closed loop blank mold temperature control system and method for automatically adjusting machine timing to maintain desired blank mold temperature/heat extraction.

Commercial hollow glass containers are typically produced in an IS (Individual Section) Machine that utilizes a two stage forming process. In the first stage, known as the blank side process, a hollow preform (parison) is formed, by either pressing or blowing a gob of molten glass within the cavity formed by a pair of blank mold halves. In the second stage, known as the blow side process, the parison first reheats from its hot interior and stretches under the influence of gravity. It is then blown using compressed air within the cavity formed by the two halves of the blow molds to form the final container shape.

The shape of the outer surface of the finished container is determined by the dimensions of the blow mold cavity. In contrast, since the inner surface is formed by compressed air, there is no predetermined shape for the inner surface. Thus, the wall thickness depends upon the redistribution of glass that occurs in the blow side process as the container transforms from a parison into a finished container.

This, in turn, depends upon the highly temperature dependent viscosity distribution of the parison as it enters the blow side process. In order to get good glass distribution in a glass container, it is thus necessary to have proper temperature distribution in the parisons when they leave the blank molds by removing the correct amount of heat from the parisons at the correct rate. This in turn is influenced by the amount of time that the parisons remain in the blank molds and by the timing and duration of the cooling of the blank mold halves.

As hot glass from the gob contacts the cooler inner surface of the blank mold, the "skin" on the outside of the parison is formed. It is necessary to have a proper skin on the parisons to facilitate inversion of the parisons and their transfer to blow molds while still at a temperature that will reheat quickly. Skin thickness depends predominantly upon contact time of the parison with the inner walls of the blank mold (which varies primarily on machine timing time), while skin temperature depends predominantly on the blank temperature. Since the temperature of the blank side mold equipment has a primary influence on the thermal state of the parison, it can be understood that it is important to maintain the desired values for this process parameter.

Today, despite the importance of maintaining proper blank mold temperatures, the process parameters affecting the cooling for the blank molds is typically adjusted manually by the I.S. machine operator based upon the visual appearance of the parisons and the finished glass containers. Due to disturbances acting on the system, for example changes in cooling air temperature, the required amount of cooling varies over time, so that the operator not only needs to setup the initial cooling timing, but also must readjust it during each shift in order to maintain the desired blank temperatures over time. This manual adjustment is typically done without the benefit of on-line measurements, based upon observation of the glass itself and spot checks of the blank mold temperature using hand held probes. The results are thus highly dependent upon both the skill and diligence of the operator.

It is beneficial to obtain parisons whose thermal state is consistent over time, and across the multiple cavities of the overall machine. In general, automatic modification of the process parameters affecting the cooling for the blank molds based upon the information available on the characteristics of the hot glass containers has not been accomplished in the past, and would thus represent a new development.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

A new approach is described here, utilizing a closed loop control where the temperatures of the blank molds are measured and the cooling and contact time parameters are automatically adjusted to maintain a desired temperature value. The invention can thereby improve process yield and quality while reducing dependence on operator skill by automatically adjusting machine timing to maintain desired blank mold temperature/heat extraction.

With this invention, a closed loop blank mold temperature control system and a method for operation of the same are used to take measured blank mold temperatures and use them to automatically control the supply of coolant air to the blank molds. This can be done independently to each blank mold half as well as independently to the plunger for each blank mold. The closed loop blank mold temperature control system can provide temperature setpoint commands, balance left and right parison temperatures, and maintain parison temperatures at a setpoint, all of which contribute to enhanced final glass container quality.

In a system embodiment, a heat measurement apparatus determines the surface temperature of at least one element of a blank mold and provides a temperature measurement indicative thereof, a valve for selectively delivering coolant from a coolant supply to the at least one element of the blank mold, a temperature input is provided to indicate a desired temperature at which the at least one element of the blank mold should be maintained, a controller provides a cooling duration output to operate the valve to deliver coolant to the at least one element of the blank mold in a manner directed to achieving the desired temperature, and an error monitoring feedback system having as inputs the temperature input and the temperature measurement which error monitoring system provides an output to operate the controller.

In a method embodiment, the surface temperature of at least one element of a blank mold is determined and a temperature measurement indicative thereof is provided, a coolant supply is provided, coolant is selectively delivered from the coolant supply through a valve to the at least one element of the blank mold, a desired temperature at which the at least one element of the blank mold should be maintained is indicated, the valve is operated with a controller to deliver coolant to the at least one element of the blank mold in a manner directed to achieving the desired temperature, and the temperature input and the temperature measurement are provided as inputs to an error monitoring feedback system which error monitoring system provides an output to operate the controller.

DESCRIPTION OF THE DRAWINGS

These and other advantages of the present invention are best understood with reference to the drawings, in which:

FIG. 5 is a basic feedback control system for controlling blank mold temperature using the surface temperature data from the rail-mounted multi-axis pyrometer of FIG. 4;

FIG. 6 is a more sophisticated feedback control system using an internal model algorithm for controlling blank mold temperature using the surface temperature data from the rail-mounted multi-axis pyrometer of FIG. 4;

DETAILED DESCRIPTION OF THE EXEMPLARY EMBODIMENTS

To better understand the operation of the closed loop blank mold temperature control system of the present invention and the approach that was taken it may be beneficial to first provide a more in depth description of the blank mold thermal process. On the blank side, heat is transferred to the interior surface of the blank molds from the hot glass and removed by cooling air which is passed through cooling passages within the blank molds. The process operates cyclically. In each machine cycle, a fresh gob of molten glass loads into the closed blank mold halves, it is then transformed into a parison, the blank mold halves are opened and the parison is removed, and finally the blank mold halves are closed and made ready to accept the next gob of molten glass.

Following this basic machine cycle, both the heat addition and the heat removal from the molds are also cyclic. In fact, during each cycle, the interior surface of the blank mold switches between two modes. In the first mode, there is hot glass in contact with the mold surfaces with a large heat flux into the blank mold. In the second mode, the glass has been removed and a relatively small amount of heat flows out of the interior mold surfaces due to natural convection and radiation. During the machine cycle, a cooling air supply valve is switched between open and closed to provide a pulse of cooling air flow through internal cooling passages of the blank mold halves. The quantity of heat removed per cycle is adjusted by controlling the duration of the cooling air pulse. Thus, the heat transfer condition within the cooling passages also switches between two modes. In the first mode, the cooling air is flowing and there is a rapid removal of heat from the cooling passage surfaces. In the second mode, the cooling air flow is stopped, and there is a negligible amount of heat transfer.

Figure 1:
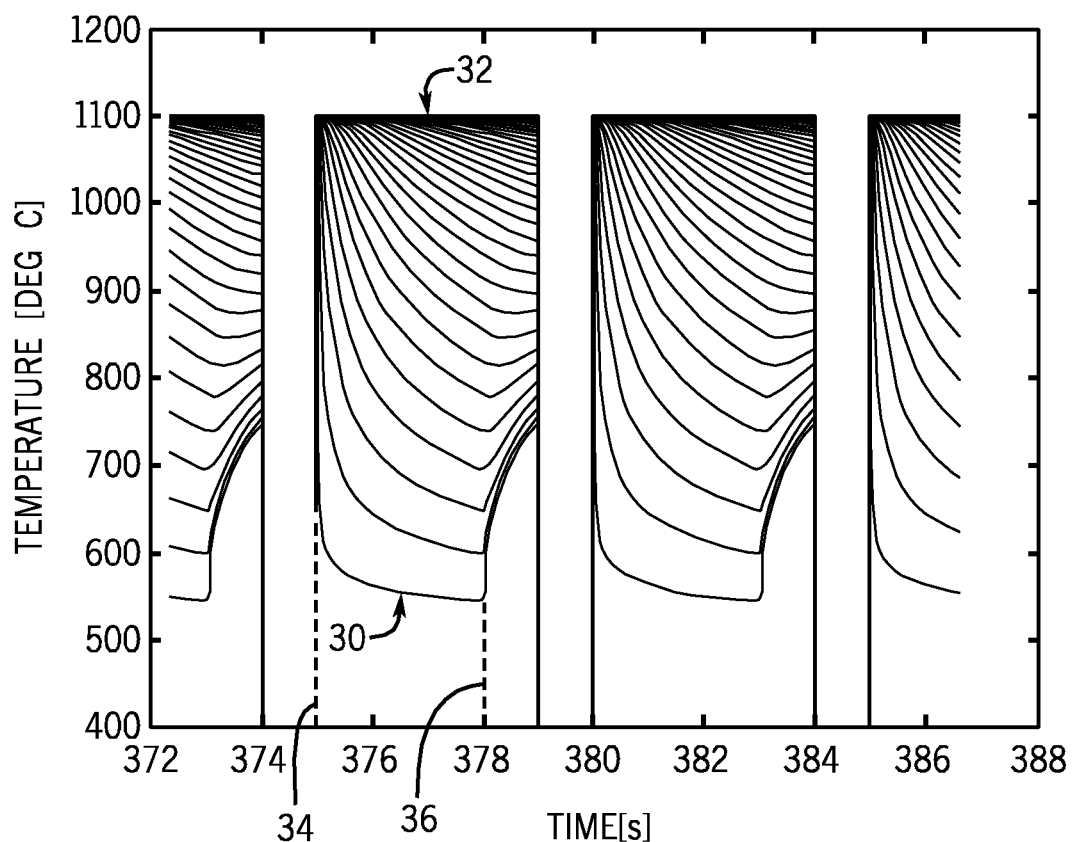
FIG. 1 is a plot showing parison temperature variation with time and radial location.
Figure 2:
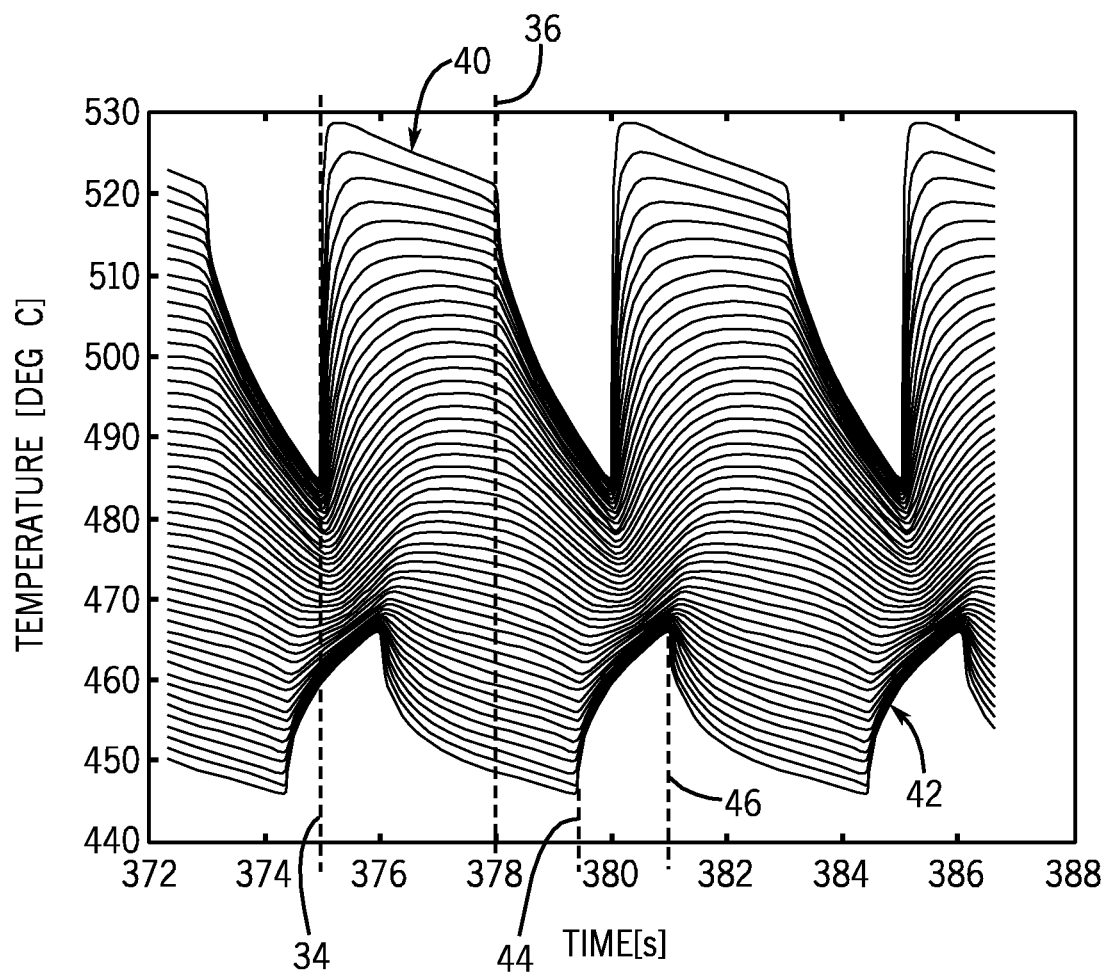
FIG. 2 is a plot showing blank mold temperature variation with time and radial location.

The results of the cyclic heating and cooling are illustrated in FIGS. 1 and 2, which show the predicted temperatures within the glass parison and within the blank mold, respectively, obtained from a simulation of a one-dimensional unsteady model of the blank mold thermal process. Referring first to FIG. 1, which shows the predicted temperatures within the glass parison, the mold contact surface of the glass parison is indicated by the reference numeral 30 and the interior of the parison is indicated by the reference numeral 32. The gob arrival time is indicated by the reference numeral 34, and the time at which the blank mold opens is indicated by the reference numeral 36.

Referring next to FIG. 2, which shows the predicted temperatures within the blank mold, the glass contact surface on the interior of the blank mold is indicated by the reference numeral 40, and the coolant passage within the blank mold is indicated by the reference numeral 42. The gob arrival time is again indicated by the reference numeral 34, and the time at which the blank mold opens is again indicated by the reference numeral 36. The time at which the flow of cooling air starts to flow is indicated by the reference numeral 44, and the time at which the flow of cooling air is stopped is indicated by the reference numeral 46.

Overall, the periodic nature of the response is quite evident, and also the sharp spatial temperature gradients shown in FIGS. 1 and 2 are also apparent, indicating that at these time scales the mold metal cannot be regarded simply as a single lumped thermal mass with a uniform temperature. Looking in further detail, and first considering the glass (parison), it can be seen that after the gob makes contact with the blank molds the glass surface temperature drops rapidly and a sharp temperature gradient or thermal skin forms on the parison.

After the blank molds open and contact is broken, this skin then begins to reheat from the hot interior of the glass. Looking at the blank mold, it can be seen that when the glass comes into contact with the blank mold, the temperature of the mold surface that is contact with the glass rapidly increases and then the elevated temperature penetrates into the interior surface of the blank mold. After the glass is removed, the surface temperature drops, as heat continues to be conducted from the surface into the interior. Along the cooling passages, the blank mold surface temperature decreases after the cooling air flow is switched on and then warms back up as heat from the relatively warm interior of the blank mold conducts back to the surface.

A number of challenges must be surmounted in order to implement a practical and effective closed loop (automatic) blank mold temperature control system. A prerequisite for any closed loop (feedback) control system is a mechanism to measure the parameter that is to be controlled, in this case, the blank mold temperature. In general, it is difficult to implement sensors and measurement systems that will survive in the harsh, high temperature conditions found in the glass container making process. In particular, a typical I.S. machine has ten to twelve sections each with between two and four blank mold cavities per section, with each cavity consisting of two blank mold halves. Accordingly, there can be between forty and ninety-six blank mold temperatures to be measured in each machine.

Furthermore, the blank mold halves move as the molds open and close and additionally the blank molds are replaced on a regular basis. Implementing typical sensors such as thermocouples in this situation would be quite difficult, due to the routing of the large number of cables that would be required, providing interconnects for changing blank molds, and allowing for flexing of leads as the blank molds open and close. In this situation, a non-contact measurement is certainly preferred, although the expense of providing individual, non-contact measurements for so many measurement points would appear to be impractical at best.

Figure 3:
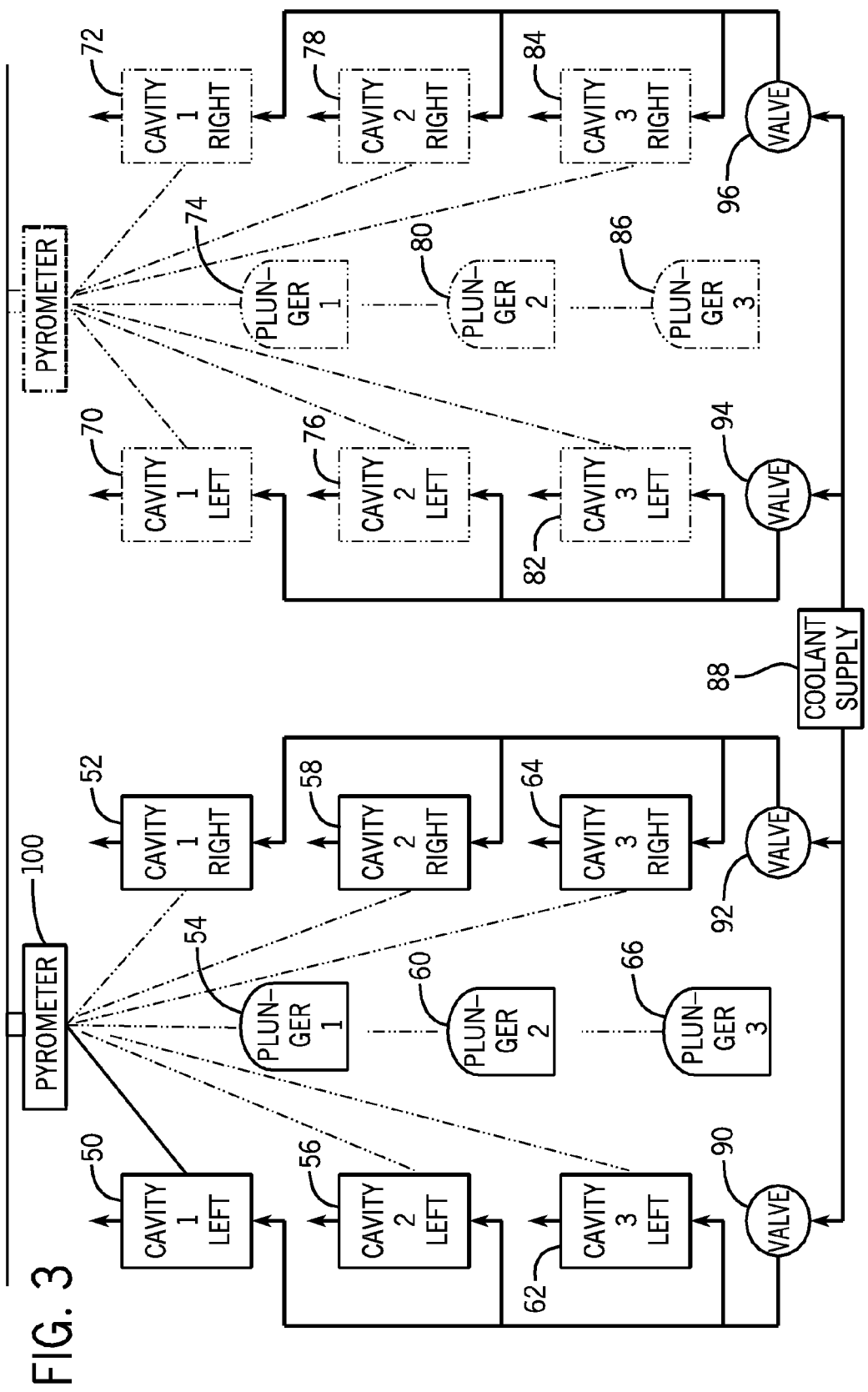
FIG. 3 is a schematic depiction of two three-gob sections of a press-and-blow I.S. machine showing cooling for the blank mold halves and having a rail-mounted multi-axis pyrometer for measuring the surface temperature of the blank mold halves and the plungers.

A schematic depiction of the blank molds of two three-gob sections of an I.S. machine with a typical blank mold cooling system is shown in FIG. 3. A first section of the I.S. machine has first cavity left and right mold halves 50 and 52, respectively, and a first cavity plunger the first cavity plunger 54, second cavity left and right mold halves 56 and 58, respectively, and a second cavity plunger the second cavity plunger 60, and third cavity left and right mold halves 62 and 64, respectively, and a third cavity plunger 66. A second section of the I.S. machine has first cavity left and right mold halves 70 and 72, respectively, and a first cavity plunger the first cavity plunger 74, second cavity left and right mold halves 76 and 78, respectively, and a second cavity plunger 80, and third cavity left and right mold halves 82 and 84, respectively, and a third cavity plunger 86.

Coolant (air) flow is supplied from a coolant supply 88 to the cavities of each of the blank molds in the two I.S. machine sections shown in FIG. 1 through a valve for the blank mold halves in each of the sections, the valves being adjustable to control the total flow of cooling air to the multiple mold halves forming one side (left or right) of each section to control their temperature. The mold cavities receive periodic heat inputs from the hot glass during each parison forming cycle, and have heat removed therefrom by the flow of cooling air to the blank mold halves.

Specifically, a valve 90 controls the supply of coolant from the coolant supply 88 to the first cavity left mold half 50, the second cavity left mold half 56, and the third cavity left mold half 62 in the first section, a valve 92 controls the supply of coolant from the coolant supply 88 to the first cavity right mold half 52, the second cavity right mold half 58, and the third cavity right mold half 64 in the first section, a valve 94 controls the supply of coolant from the coolant supply 88 to the first cavity left mold half 70, the second cavity left mold half 76, and the third cavity left mold half 82 in the second section, and a valve 96 controls the supply of coolant from the coolant supply 88 to the first cavity right mold half 72, the second cavity right mold half 78, and the third cavity right mold half 84 in the second section. It is, of course, also possible to have individual valves for each mold half and to control the cooling in each of the mold halves individually.

The surface temperatures in the blank mold halves may be monitored in any suitable manner. For this purpose, the surface temperatures could be measured by sensors embedded in the molds, fixed pyrometers or thermal cameras viewing the molds, or, as is preferable, a single traveling, rotatable pyrometer which cyclically traverses the machine sampling the temperatures of the left and right cavities of each section. The closed loop blank mold temperature control system of the present invention preferably utilizes the last of these approaches, which is commercially available from Emhart Glass S.A. as the TCS™ System, which is a pyrometer based system that may be used to monitor the temperatures of mold equipment on the blank side of an I.S. machine. This system is shown schematically in FIG. 3 and in greater detail in FIG. 4.

Figure 4:
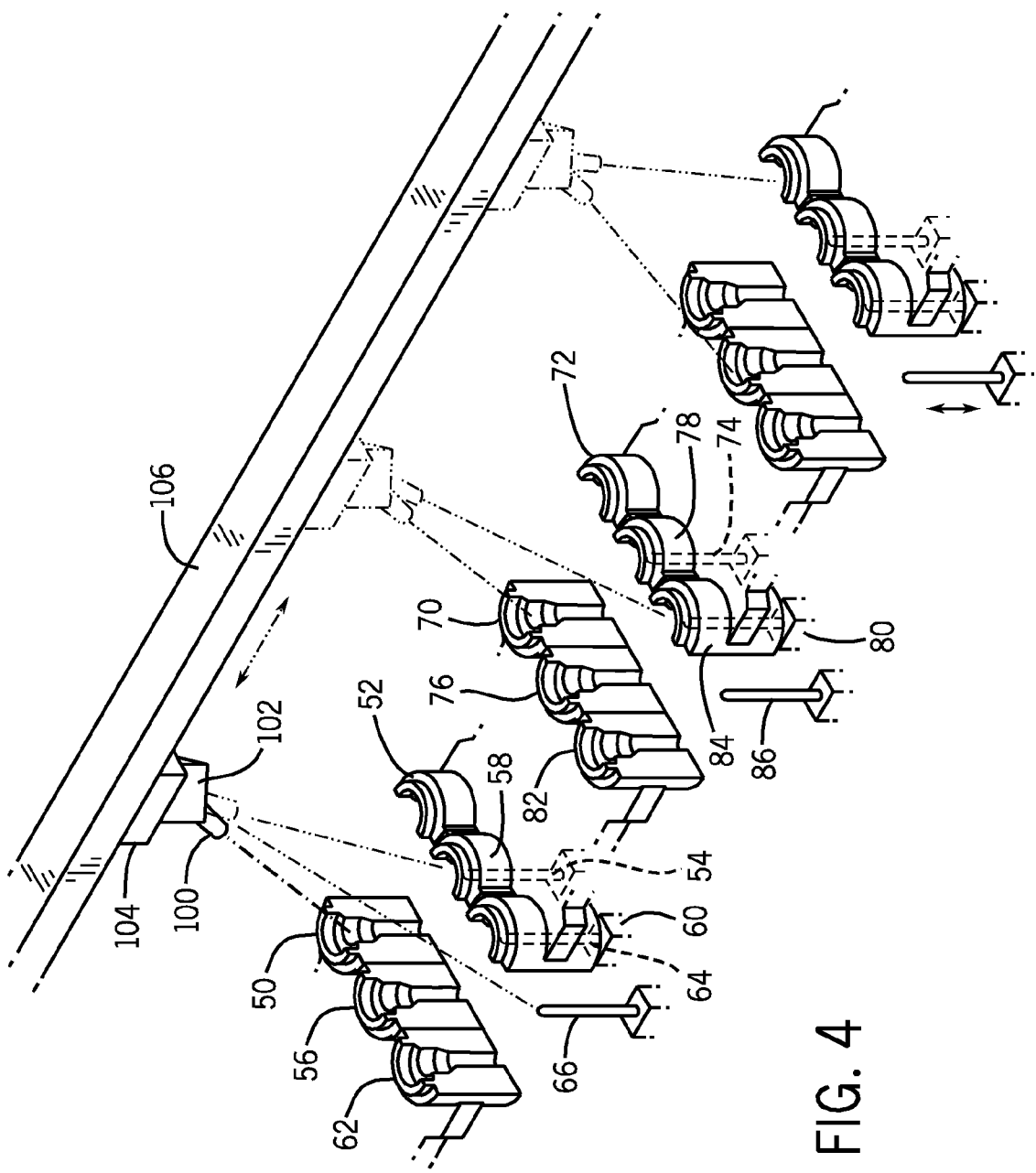
FIG. 4 is a schematic depiction similar to that shown in FIG. 3 but showing in greater detail the rail-mounted multi-axis traversing pyrometer used to measure the surface temperature of the blank mold halves and the plungers.

Referring particularly to FIG. 4, single high speed pyrometer 100 is mounted from a multi-axis mount 102 supported by an automatic positioning system 104 having supported from a rail 106 extending the entire length of the I.S. machine. (The pyrometer 100 is actually mounted on the multi-axis mount 102 with two degrees of movement (rotation in each of orthogonal horizontal and vertical planes), with the third degree of movement coming from the movement of the automatic positioning system 104 on the rail 106 between sections.) As implemented by the closed loop blank mold temperature control system of the present invention, the system is capable of monitoring the temperatures of several points of each section, potentially including both blank mold halves of each blank mold in each section and their respective plungers. When the automatic positioning system 104 moves on the rail 106 to a position adjacent to one of the sections, the pyrometer 100 may then be aimed by the multi-axis mount 102 at individual blank mold halves and plungers to obtain measurement of the temperatures of each half of each of the individual mold cavities and the plungers. The pyrometer 100 may be moved by the automatic positioning system to traverse the rail 106 to move back and forth to any of the sections in the entire I.S. machine to provide periodic updates of each desired temperature measurement point.

Consideration of the underlying process to be controlled reveals that the closed loop control of blank mold temperatures differs in a number of key aspects from the typical industrial process control problem. In the typical process control problem, the dynamics of the process to be controlled, e.g. the level in a tank, or the temperature of a well mixed flow, are well represented by a low order, lumped parameter (ordinary differential equation) dynamic system with continuous (in time) inputs from the actuator used to adjust the process. In contrast, as previously discussed, at these time scales, blank molds clearly exhibit the characteristic of a distributed parameter system, in which the temperatures vary spatially in the radial (depth into the mold), circumferential, and axial directions.

Also, both the control input (cooling air), and heat inputs (hot glass) are discontinuous in time and switch periodically with each successive machine cycle of gob loading and parison formation. These factors make the control design problem somewhat more challenging as it is not possible to directly derive simple analytical process models to be used for analyzing and designing the control. Instead the control development must rely upon more elaborate simulation models, and experimental testing with the actual process.

Additionally, in order to implement a closed loop control system it is necessary to have a means to adjust the timing of the start and/or end of cooling air pulse, and maintain these values within defined limits relative to the other system timing events. It is also important to have additional information regarding the state of the machine sections being measured, for example whether they are running, or have recently been swabbed (Operators periodically apply lubricant to the molds in an operation known as swabbing).

In general, commercial timing control systems do not provide such an external interface. To overcome this issue, the closed loop blank mold temperature control system of the present invention may be integrated directly within the a timing control system such as the Emhart FlexIS™ forming control system available from Emhart Glass S.A. to provide the necessary intercommunication between the control and timing systems.

Referring next to FIG. 5, a first exemplary feedback control system that uses surface temperature data for the blank molds that may be obtained using information obtained from the pyrometer 100 of FIG. 4 or in any other suitable manner to control blank mold temperatures. Each blank mold cavity 110 receives periodic heat inputs from hot glass during each parison forming cycle. The combined effect of the heat supplied from the hot glass to the blank mold cavity 110 and the heat removed by the coolant air from the blank mold cavity 110 results in a time varying mold thermal state 112 at the contact surface of the blank mold cavity 110.

The principle of operation of the embodiment illustrated in FIG. 5 is as follows. For each blank mold cavity, a setpoint (desired) temperature is compared with the measured value obtained from the pyrometer 100 (shown in FIG. 4). The difference is operated upon by a control algorithm which then computes an adjusted cooling duration. The adjusted cooling duration is then applied to the physical blank molds by the timing control system, and the new resulting temperature is measured by the pyrometer 100 to complete the loop.

As previously discussed, the temperature of the blank molds varies both spatially and temporally. It is noted that the measurement made by the pyrometer 100 is made at a single location on the blank mold surface and at a single point in time relative to the I.S. machine cycle. For example, this point in time may be just after the glass leaves the blank molds and the mold surface can be seen by the pyrometer. The system is thus inherently a sampled data system, with the sampling period set by the round trip time required by the pyrometer 100 to measure temperatures for the entire I.S. machine. Typically this may be between five and twenty minutes depending upon the number of measured cavities and the cycle rate of the machine.

Referring again to FIG. 5, in the closed loop blank mold temperature control system of the present invention of FIG. 4, the mold thermal state 112 is measured by a measurement system 114 that may be the pyrometer 100 based system described above in conjunction with FIG. 4. This measurement system 114 provides as an output a temperature measurement 116. It will be appreciated that the temperature may be measured and controlled independently for different mold halves by the closed loop blank mold temperature control system of the present invention.

The temperature measurement 116 from the blank mold is subtracted from a desired temperature established by a temperature setpoint 118 in a summer 120, the output of which is an error signal 122. This error signal 122 is provided to a controller 124 that computes a corrective cooling duration the cooling duration 126 that may be used to modulate the valves 90, 92, 94, and 96 of the system illustrated in FIG. 3 and described above with the resulting flow of coolant air being provided to the blank mold cavity 110 to modify the mold thermal state 112 in order to obtain the desired temperatures at the measurement locations.

This is done by controlling the cooling duration 126 during each machine cycle in which the valves 90, 92, 94, and 96 are held open. Instead of a single controller 124, multiple, identical controllers may instead be used with each controller being responsible for modulating an individual one of the valves 90, 92, 94, and 96 to obtain a given measured temperature. If individual valves are used for each mold half and to control the cooling in each of the mold halves individually, identical controllers may instead be used with each controller being responsible for modulating a valve to control the cooling of each mold half.

A variety of algorithms could be utilized to actually implement the controller 124, including the well known Proportional Integral Controller ("PID"), as well as numerous types of model-based controls, in which a model of the actual process is utilized to help compute an appropriate control signal. To control the cooling duration 126, either the time at which the valve is opened, the time at which the valve is closed, or both could be modified. Limits would be employed to keep the opening duration less than or equal to the available cycle time, or any other desired specified duration. Limits and start times could also be set to only allow cooling during a portion of the cycle when it is considered most desirable, or to avoid certain times when cooling would be considered undesirable. For example, it would be desirable to avoid a situation in which exhausted cooling air is blown onto on the parison.

An alternate embodiment in which a particularly attractive Internal Model Control Structure model-based scheme is utilized is illustrated in FIG. 6. Common elements from FIG. 5 have common reference numbers, namely the blank mold cavity 110, the mold thermal state 112, the measurement system 114, and the temperature measurement 116. The control system shown in FIG. 6 uses both a predictive model and an inverse model, with the predictive model being used to compute the expected reaction of the blank mold cavity 110 to a change in the cooling duration, and the inverse model being used to compute a cooling duration that will provide an approximation of the desired mold temperature.

The system illustrated in FIG. 6 operates based upon a filtered setpoint 130 that is provided as an input to an inverse mold thermal model 132 that computes a cooling duration 134 that should approximately achieve the desired mold temperature. The combined effect of the heat supplied from the hot glass to the blank mold cavity 110 and the heat removed by the coolant air from the blank mold cavity 110 as controlled by the cooling duration 134 results in the time varying mold thermal state 112 at the contact surface of the blank mold cavity 110. The mold thermal state 112 is measured by the measurement system 114 which provides as an output the temperature measurements 116 of the blank mold cavity 110 temperature.

The computed cooling duration 134 is also applied to a predictive mold thermal model 136, which in turn computes the predicted temperature 138 of the blank mold cavity 110. The predicted temperature 138 is subtracted from the temperature measurement 116 by a summer 140, producing a modeling error 142. If the model of the process were perfect, this signal would be zero. However, due to numerous actual factors which can not be perfectly taken into account, the modeling error will generally be nonzero.

The modeling error 142 is subtracted from a desired temperature setpoint 144 in a summer 146, the output of which is a modified setpoint 148. It will be understood, that if, due to modeling error, the current value of the modified setpoint 148 produces too great a response, then the modified setpoint 148 is modified accordingly to ask for a smaller response, or vice versa. In order to provide robustness against high frequency modeling errors, and to avoid nonrealizable implementations and to avoid reaction to spurious high frequency noise, the modified setpoint 148 is passed through a low pass filter 150, for example a rolling average value, thereby producing the filtered setpoint 130, thus completing the control loop. For an overall control system, multiple loops, one per valve, each with the same structure, and operation as that shown in FIG. 6 would be implemented.

The closed loop blank mold temperature control system of the present invention can cover an entire I.S. machine, periodically sampling each blank mold half in each section. The closed loop blank mold temperature control system takes less than one minute to sample all blank mold halves and all plungers in one section, and approximately five minutes for an entire I.S. machine to do so. Even with a sampling rate of once every five to twenty minutes, effective, stable closed loop control of blank mold temperatures can be established.

The closed loop system has now been successfully implemented and tested on operating IS machines. Some key results illustrating the capabilities of the closed loop system are presented in FIGS. 7 through 9.

Figure 7:
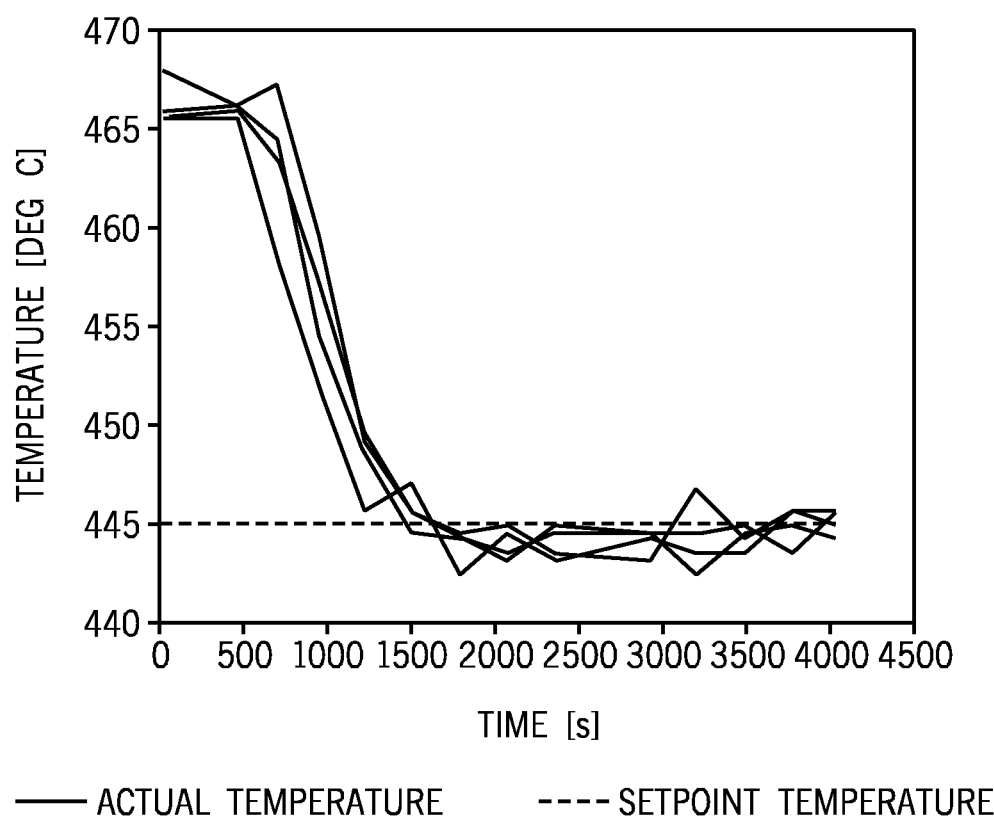
FIG. 7 is a plot of command following step response.
Figure 8:
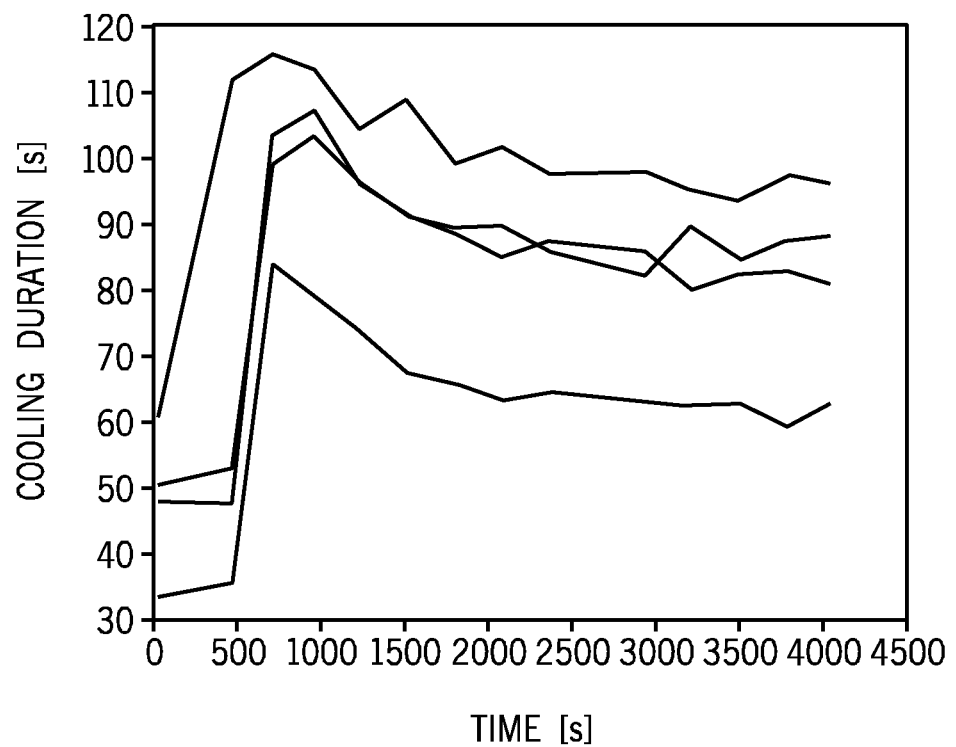
FIG. 8 is a plot of step response control output.

The command following capability of the closed loop system is illustrated in FIG. 7 for four different mold cavities placed under automatic control. At t=0, the temperature setpoint is changed from 465° C. down to 445° C. It can be seen that the four cavity temperatures move and settle to the new commanded setpoint value, without excessive overshoot or oscillation. This demonstrates how an operator can directly modify the cavity temperature simply by adjusting a setpoint value.

In contrast, without an automatic control, even if measurements were available, the user would have had to adjust the cooling time by trial and error until the desired temperature was achieved. Since the open loop system typically takes approximately 20 minutes to completely respond to each change in cooling duration, this trial and error adjustment can be lengthy, resulting in extended periods in which the production quality may be adversely impacted. The difficulty, in manually adjusting the cooling duration is further reinforced by FIG. 8, which plots the controller outputs (cooling durations) that were required to obtain the temperature changes shown in FIG. 7. It can be seen that the actual final magnitude of the required adjustment is somewhat different for each cavity. It is noted that the required amount of cooling will also depend upon other factors such as the cooling air temperature, and fan pressure, further motivating the use of an automatic control to provide accurate and timely changes to the mold temperatures.

Figure 9:
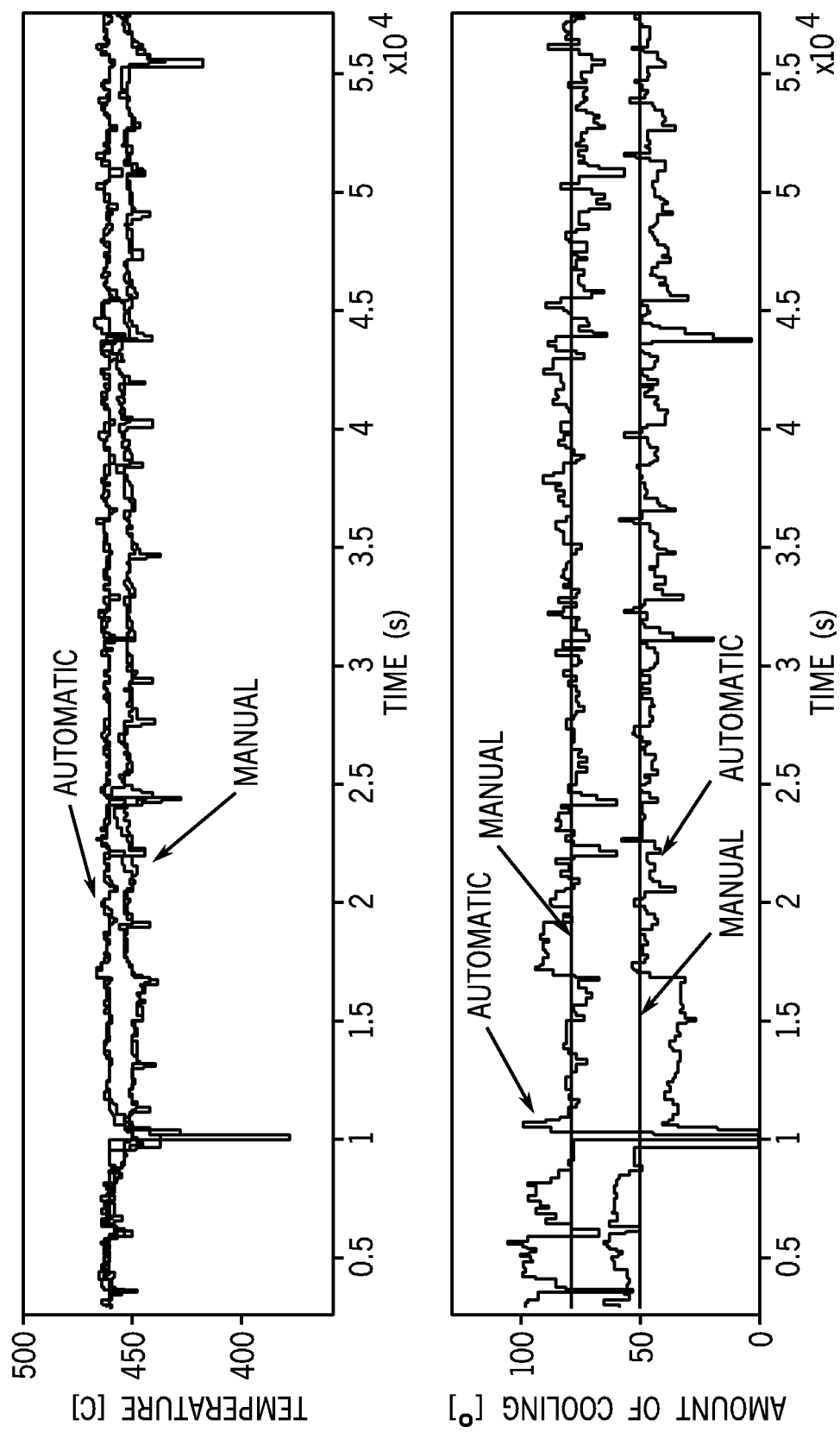
FIG. 9 shows plots of temperature and the amount of cooling for maintaining a constant temperature as compared between manual control and automatic control.

In addition to the ability to obtain quick and accurate command following, another major benefit of the closed loop control is the ability to maintain constant cavity temperatures in the face of unavoidable disturbance inputs. Typical disturbances include changes in cooling air temperature and supply pressure. The capability of the closed loop to maintain a constant temperature in spite of disturbances is illustrated in FIG. 9, which compares the temperatures variation for two machine sections (left and right cavities for each section), where one section is under automatic control and one is left in manual (constant cooling duration).

It can be seen that within several hours, the manual section temperature has drifted down by approximately 15° C., and then continues to vary. In contrast the cavities under automatic control maintain the desired 460° C. setpoint over the entire period. In the lower half of FIG. 9, the controller outputs are shown. It can be seen that in order to maintain the constant temperatures, the cooling duration must be continually adjusted.

It will be appreciated that without the automatic control it would require a great deal of time and attention on the part of the operator to make such adjustments, and further, that it would be difficult for the operator to know the precise amount of correction that would be required. The cyclic disturbances evident in both the automatic and manual data shown in FIG. 9 is due the periodic application of lubricant (swabbing) of the molds that is performed approximately every thirty minutes. It can be seen that the automatic control can also handle such disturbances, and returns the temperatures to their setpoint values.

The blank side thermal process strongly influences the thermal state of the parison, which in turn influences the final container quality. Due to process disturbances and variability in flow distribution, the amount of blank mold cooling required in order to maintain a consistent thermal state of the parison varies over time and for different mold cavities. Traditionally, to compensate for this variability, the amount of cooling is adjusted manually and the results depend upon the skill and diligence of the operator. To provide more consistent production, a practical automatic blank mold temperature control system has been developed.

The system that has been developed has been enabled by the combination of: 1. a traversing pyrometer providing the necessary measurements; 2. a close integration with the timing control system allowing the machine cooling durations to be directly adjusted; and 3. an understanding of the system dynamics gained from analysis and simulation of the underlying physical process.

The system has been experimentally evaluated on operating IS glass production machines, and the results show that the automatic system is capable of providing automatic adjustment to the operating temperature, and maintaining a consistent production temperature.

Adoption of this new technology can be expected to reduce the variability of the blank mold temperatures ultimately improving overall yields. By relieving operating personnel of the need to constantly adjust the blank cooling, it can also be expected that they will have more time to beneficially devote to problem solving in other areas.

In the simplest rendition of the system of the present invention, only a single representative temperature would be measured for each mold half, for example, one point on the middle cavity. Alternatively multiple measurements may be made, including each of the cavities within the section or even multiple points on each cavity surface. In the latter case, the valve could be actuated to obtain a desired section average, or alternatively to control the most extreme (maximum or minimum) temperature.

While the present invention is specifically described here in terms of a single valve controlling all of the cavities for one side of a section, it may also be modified in alternate embodiments in which additional valves are provided to control the flow of coolant air either to each blank mold half or even to individual zones within each blank mold half. In these embodiments, a control loop would be implemented for each valve, with each such loop being responsible for controlling only a single blank mold half or a single blank mold half zone temperature corresponding to the locality of the flow controlled by the individual valve.

It should also be noted that while the closed loop blank mold temperature control system of the present invention is initially intended to apply this technique to the blank side of an I.S. machine, the systems and methods described herein could also be employed to control blow mold temperatures. The technique could further be employed to modulate the surface temperature of the plungers, with their temperatures being measured just after the parison is inverted. In this case, the duration within the cycle that the plunger cooling valve was open would be modulated. The technique could also be employed in a similar manner to control a neck ring coolant valve in order to maintain a desired neck ring temperature.

Although the foregoing description of the closed loop blank mold temperature control system of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A blank mold cooling cycle timing control system for an individual section machine, the individual section machine has multiple sections and multiple blank molds in each section, comprising:
    a heat measurement apparatus that determines a surface temperature of at least one element of a blank mold and provides a temperature measurement indicative thereof;
    a coolant supply;
    a valve arrangement for selectively delivering coolant from the coolant supply to the at least one element of the blank mold;
    a temperature input indicating a desired temperature at which the at least one element of the blank mold should be maintained;
    a controller for providing a cooling duration output to operate the valve arrangement to deliver coolant to the at least one element of the blank mold in a manner directed to achieving the desired temperature;
    an error monitoring feedback system having as inputs the temperature input and the temperature measurement which error monitoring feedback system provides an output to operate the controller; and
    wherein the heat measurement apparatus comprises:
        a multi-axis pyrometer mounted on a pyrometer support rail to move between sections, and wherein the multi-axis pyrometer determines the surface temperature of the at least one element of each of the blank molds in each of the sections; and
    wherein the error monitoring feedback system comprises:
        a mold thermal model controller that computes a predicted temperature of the blank mold;
        a first summer for subtracting the predicted temperature provided by the mold thermal model controller from the temperature measurement provided by the heat measurement apparatus to produce a modeling error; and
        a second summer for subtracting the modeling error provided by the first summer from the temperature input indicative of the desired temperature to produce an error signal that is provided to the controller.

2. A blank mold cooling cycle timing control system as defined in claim 1, wherein each blank mold has a left mold half, a right mold half, and a plunger, and wherein the heat measurement apparatus is capable of determining the surface temperatures of each of the left mold half, the right mold half, and the plunger of each blank mold.

3. A blank mold cooling cycle timing control system as defined in claim 1, wherein each blank mold has a left mold half, a right mold half, and a plunger, wherein the left mold halves in each section have a flow of coolant thereto controlled by a single valve of the valve arrangement, and wherein the right mold halves in each section have a flow of coolant thereto controlled by a single valve of the valve arrangement.

4. A blank mold cooling cycle timing control system as defined in claim 1, wherein each blank mold has a left mold half and a right mold half, and wherein a flow of coolant to each left or right mold half is controlled by a single valve of the valve arrangement.

5. A blank mold cooling cycle timing control system as defined in claim 1, wherein each blank mold has a left mold half and a right mold half, and wherein each left or right mold half has a plurality of zones, and wherein a flow of coolant to each zone of each left or right mold half is controlled by a single valve.

6. A blank mold cooling cycle timing control system as defined in claim 1, wherein the controller comprises:
    an inverse mold thermal model controller.

7. A blank mold cooling cycle timing control system as defined in claim 1, additionally comprising:
    a low pass filter for filtering the error signal before it is provided to the controller.

8. A blank mold cooling cycle timing control system as defined in claim 1, wherein the cooling duration output is supplied to the mold thermal model controller for computing the predicted temperature of the blank mold.

9. A method of controlling blank mold cooling cycle timing in an individual section machine, the individual section machine has multiple sections and multiple blank molds in each section, comprising:
    determining, with a heat measurement apparatus, the surface temperature of at least one element of a blank mold and provides a temperature measurement indicative thereof;
    providing a coolant supply;
    selectively delivering coolant from the coolant supply through a valve to the at least one element of the blank mold;
    indicating a desired temperature at which the at least one element of the blank mold should be maintained;
    operating the valve with a controller that determines a cooling duration output based on the desired temperature to deliver coolant to the at least one element of the blank mold in a manner directed to achieving the desired temperature; and
    providing the temperature input and the temperature measurement as inputs to an error monitoring feedback system;
    providing an output to operate the controller, by the error monitoring system wherein the determining step comprises:
mounting the heat measurement apparatus in the form of a multi-axis pyrometer on a pyrometer support rail to move between sections, and wherein the multi-axis pyrometer determines the temperatures of each of the blank molds in each of the sections; and
wherein providing an output to operate the controller, by the error monitoring system comprises:
computing a predicted temperature of the blank mold with a mold thermal model controller;
subtracting the predicted temperature provided by the mold thermal model controller from the temperature measurement provided by the heat measurement apparatus to produce a modeling error; and
subtracting the modeling error from the temperature input indicative of the desired temperature to produce the output to operate the controller.

10. A method as defined in claim 9, wherein the blank mold has a left mold half, a right mold half, and a plunger, and wherein the determining step comprises determining the temperatures of each of the left mold half, the right mold half, and the plunger.

11. A method as defined in claim 9, wherein each blank mold has a left mold half, a right mold half, and a plunger, additionally comprising:
controlling a flow of coolant to the left mold halves in each section with a single valve; and
controlling a flow of coolant to the right mold halves in each section with a single valve.

12. A method as defined in claim 9, wherein each blank mold has a left mold half and a right mold half, additionally comprising:
controlling a flow of coolant to each left or right mold half with a single valve.

13. A method as defined in claim 9, wherein each blank mold has a left mold half and a right mold half, and wherein each left or right mold half has a plurality of zones, additionally comprising:
controlling a flow of coolant to each zone of each left or right mold half with a single valve.

14. A method as defined in claim 9, additionally comprising:
low pass filtering the output to operate the controller before it is provided to the controller.

15. The method of claim 9, wherein computing a predicted temperature of the blank mold with a mold thermal model controller uses the cooling duration determined by the controller.

16. A blank mold cooling cycle timing control system for an individual section machine, the individual section machine has multiple sections and multiple blank molds in each section, the blank mold cooling cycle timing control system comprising:
a heat measurement apparatus including a multi-axis pyrometer mounted on a pyrometer support rail to move between sections, the multi-axis pyrometer is capable of determining a surface temperature of at least one element of at least one of the blank molds in each of the sections and provides a temperature measurement indicative thereof;
a coolant supply;
a valve arrangement for selectively delivering coolant from the coolant supply to the at least one element of the blank molds;
a temperature input for each of the at least one element indicating a desired temperature at which the at least one element should be maintained;
a controller for providing a cooling duration output to operate the valve arrangement to deliver coolant to the at least one element in a manner directed to achieving the desired temperature; and
an error monitoring feedback system having as inputs the temperature input and the temperature measurement which error monitoring feedback system provides an output to operate the controller, wherein the error monitoring feedback system comprises:
a mold thermal model controller that computes a predicted temperature of the blank mold;
a first summer for subtracting the predicted temperature provided by the mold thermal model controller from the temperature measurement provided by the heat measurement apparatus to produce a modeling error; and
a second summer for subtracting the modeling error provided by the first summer from the temperature input indicative of the desired temperature to produce an error signal that is provided to the controller.

17. A blank mold cooling cycle timing control system as defined in claim 16, wherein the cooling duration output is supplied to the mold thermal model controller for computing the predicted temperature of the blank mold.

* * * * *